United States Patent
Zernhelt et al.

(10) Patent No.: US 10,912,418 B2
(45) Date of Patent: Feb. 9, 2021

(54) COFFEE GRINDER WITH STATIC ELECTRICITY GROUND

(71) Applicant: Helen of Troy Limited, St. Michael (BB)

(72) Inventors: Justin Michael Zernhelt, Brooklyn, NY (US); Mackenzie Mor, Brooklyn, NY (US); Daniel Scott Juda, Brooklyn, NY (US)

(73) Assignee: Helen of Troy Limited, St. Michael (BB)

( * ) Notice: Subject to any disclaimer, the term of this patent is extended or adjusted under 35 U.S.C. 154(b) by 268 days.

(21) Appl. No.: 15/725,452

(22) Filed: Oct. 5, 2017

(65) Prior Publication Data
US 2019/0104888 A1    Apr. 11, 2019

(51) Int. Cl.
    *A47J 42/40*    (2006.01)
(52) U.S. Cl.
    CPC .................................. *A47J 42/40* (2013.01)
(58) Field of Classification Search
    CPC ........ A47J 42/40; A47J 31/56; A47J 31/0573; A47J 17/18; A47J 31/42; A47J 42/54; A47J 42/20; A47J 42/06; A47J 31/46; A47J 42/38; A47J 42/50
    USPC .......... 99/281, 286, 295, 326, 348, 508–511, 99/584, 623, 629–634, 285, 287, 290, 99/291, 323; D07/372, 373, 414; 241/137, 170, 172, 173, 184
    See application file for complete search history.

(56) References Cited

U.S. PATENT DOCUMENTS

| | | | | |
|---|---|---|---|---|
| 3,060,835 A | * | 10/1962 | Eads | A47J 31/005 99/283 |
| 5,417,145 A | * | 5/1995 | Joseph, Jr. | A47J 31/42 241/33 |
| 5,503,060 A | * | 4/1996 | Morecroft | A47J 31/0573 99/295 |

(Continued)

FOREIGN PATENT DOCUMENTS

FR    2313849    12/1976

OTHER PUBLICATIONS

Screen captures from video "Review: Mazzer Mini Electronic Coffee Grinder", by Whole Latte Love (https://www.youtube.com/watch?v=f2v8seWSM2l), Published Jan. 19, 2016, Retrieved on Sep. 20, 2019 (Year: 2016).*

(Continued)

*Primary Examiner* — Dana Ross
*Assistant Examiner* — Michael S. Poetzinger
(74) *Attorney, Agent, or Firm* — Rankin, Hill & Clark LLP

(57) ABSTRACT

A coffee bean grinder includes a grinding apparatus, a hopper, a receptacle, and an electrical ground contact. The hopper is arranged with respect to the grinding apparatus for feeding coffee beans to the grinding apparatus. The receptacle is for receiving coffee beans that have been ground by the grounding apparatus. The receptacle includes an electrically conductive material and is removable from a location where the receptacle is arranged to receive ground coffee beans from the grinding apparatus. The electrical ground contact is electrically connected with ground and is positioned with respect to the grinding apparatus such that when the receptacle is arranged to receive ground coffee beans from the grinding apparatus, the electrically ground contact contacts the receptacle.

15 Claims, 4 Drawing Sheets

(56) References Cited

U.S. PATENT DOCUMENTS

| | | | |
|---|---|---|---|
| 5,950,941 A | 9/1999 | McNeil et al. | |
| 6,595,445 B2 | 7/2003 | Fagan et al. | |
| 8,944,354 B2 | 2/2015 | Hulett et al. | |
| 10,314,426 B2* | 6/2019 | Hulett | A47J 31/42 |
| 2013/0133520 A1* | 5/2013 | Hulett | A47J 31/40 |
| | | | 99/285 |
| 2016/0192809 A1 | 7/2016 | Bakke | |
| 2017/0049271 A1 | 2/2017 | Shima | |

OTHER PUBLICATIONS

"Ground (electricity)", from Wikipedia, Web page <https://en.wikipedia.org/wiki/Ground_(electricity)>, Aug. 24, 2017, retrieved on Sep. 20, 2019 from Internet Archinve Wayback Machine <https://web.archive.org/web/20170824043516/https://en.wikipedia.org/wiki/Ground_%28electricity%29> (Year: 2017).*

Guo, J., et al., Chinese Patent Publication CN206183079U with an English Machine Translation, May 24, 2017 (Year: 2017).*

Screen captures from video "Cuisinart Burr Coffee Grinder Addressing Static Cling", by helpfulnatural (https://www.youtube.com/watch?v=9HD4Z0KfslA), Published Mar. 18, 2016; Retrieved Apr. 1, 2020 (Year: 2016).*

"Mazzer Grinders" from La Marzocco webpage (http://www.lamarzoccousa.com/portfolio/mazzer-grinders/), Jul. 28, 2017, retrieved on Sep. 20, 2019 from Internet Archive Wayback Machine (https://web.archive.org/web/20170728231645/http://www.lamarzoccousa.com:80/portfolio/mazzer-grinders/) (Year: 2017).*

Mazzer Electrical Diagram MIE08B00 "Mini Electronic 110/60/1", Mar. 2001, Mazzer (Year: 2001).*

Underwriters Laboratories, "UL 763 Standard for Motor-Operated Commercial Food Preparing Machines", Underwriters Laboratories Inc., Nov. 30, 2000 (Year: 2000).*

Appliance classes—Wikipedia.

* cited by examiner

COFFEE GRINDER WITH STATIC ELECTRICITY GROUND

BACKGROUND

Coffee bean grinders typically include a hopper in which coffee beans are placed to be delivered to a grinding apparatus. The grinding apparatus grinds the coffee beans and delivers ground coffee beans to a receptacle. The receptacle can be part of a coffee brewing machine such that the receptacle is a brew basket or similar receptacle. Coffee bean grinders can also be made separately from the coffee brewing machine where the ground coffee is taken from the receptacle and poured into a brew basket.

Fine particles can accumulate on surfaces of the coffee grinder due to the presence of an electrostatic charge on the stream of particles exiting the grinding apparatus. Attempts to neutralize the electrostatic charge imparted to the ground coffee and other particles exiting the grinding apparatus have been made often by having the particles exiting the grinding apparatus pass over or through and contact an electrically conductive material, which is electrically connected with ground. Improvements to neutralize or mitigate the electrostatic charge can be made.

SUMMARY

In view of the foregoing, a coffee bean grinder includes a grinding apparatus, a hopper, a receptacle, and an electrical ground contact. The hopper is arranged with respect to the grinding apparatus for feeding coffee beans to the grinding apparatus. The receptacle is for receiving coffee beans that have been ground by the grounding apparatus. The receptacle includes an electrically conductive material and is removable from a location where the receptacle is arranged to receive ground coffee beans from the grinding apparatus. The electrical ground contact is electrically connected with ground and is positioned with respect to the grinding apparatus such that when the receptacle is arranged to receive ground coffee beans from the grinding apparatus, the electrically ground contact contacts the receptacle.

Another example of a coffee bean grinder includes a grinding apparatus, a hopper, and an electrical ground contact. The grinding apparatus includes a ground coffee discharge through which ground coffee beans are discharged from the grinding apparatus. The hopper is arranged with respect to the grinding apparatus for feeding coffee beans to the grinding apparatus. The electrical ground contact electrically connects with ground and is positioned with respect to the ground coffee discharge such that ground coffee beans passing through the ground coffee discharge do not contact the electrical ground contact.

DETAILED DESCRIPTION

Figure 1:
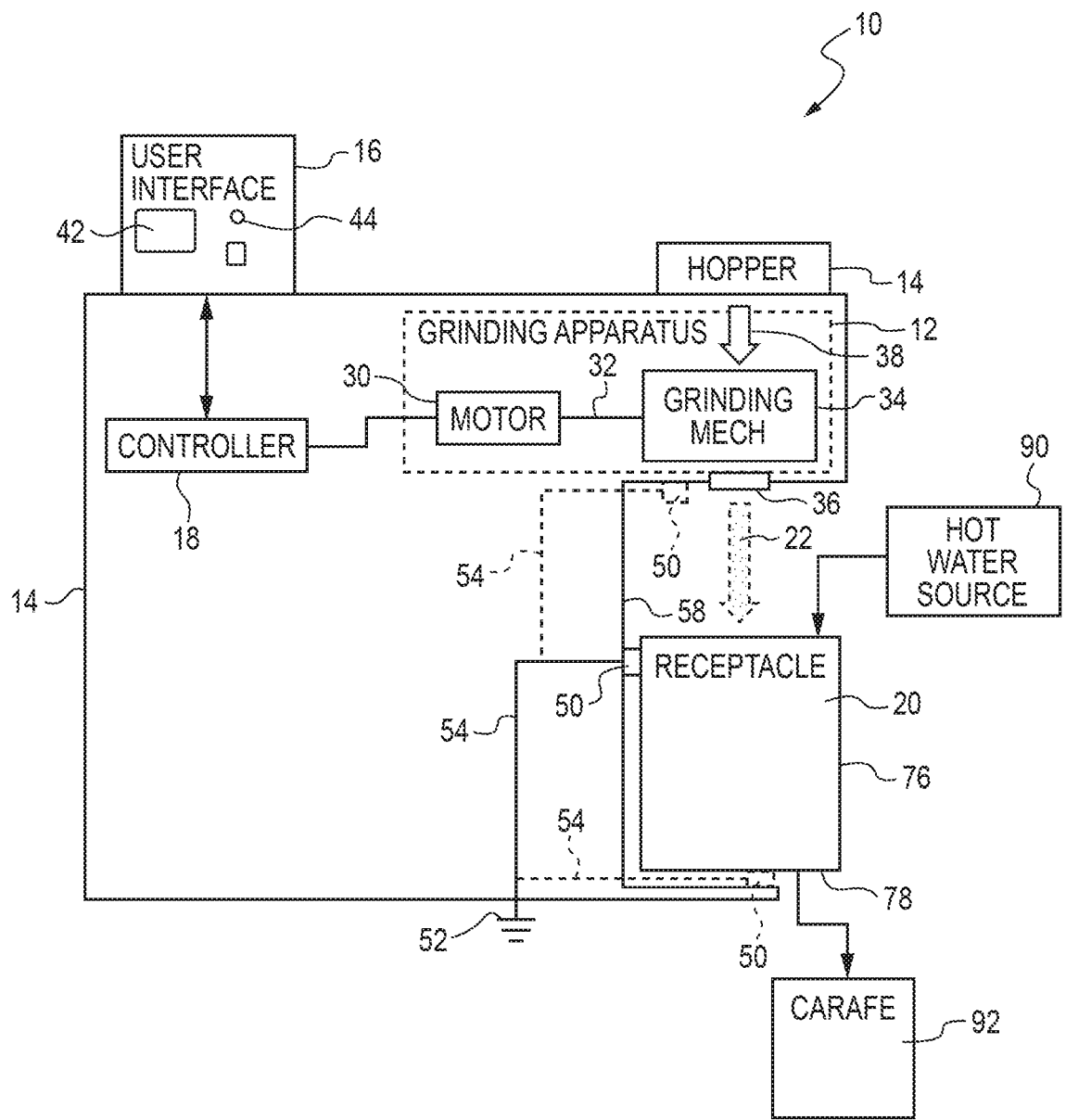
FIG. 1 is a schematic depiction of a coffee bean grinder.
Figure 2:
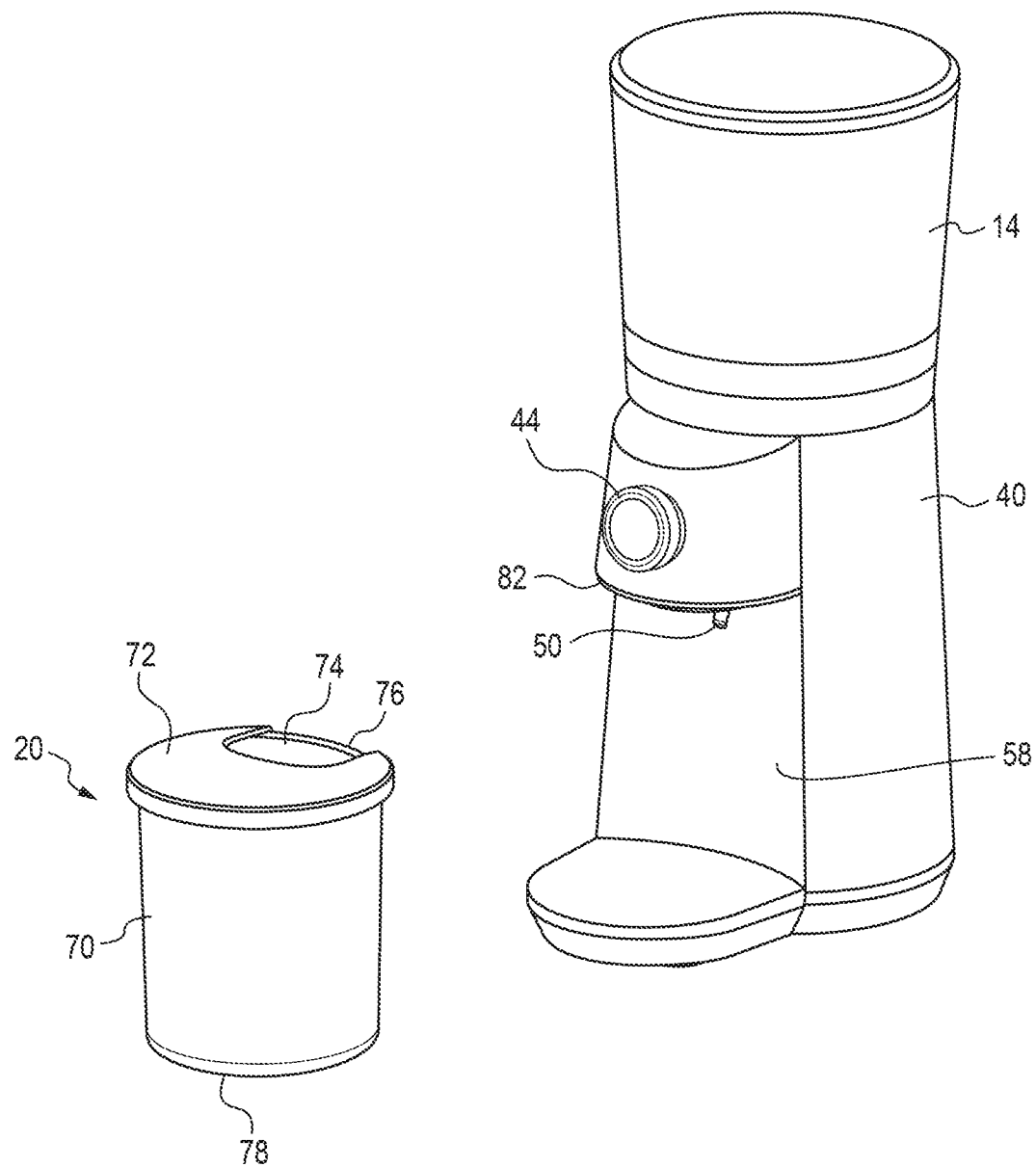
FIG. 2 is a perspective view of an embodiment of the coffee bean grinder schematically depicted in FIG. 1.
Figure 3:
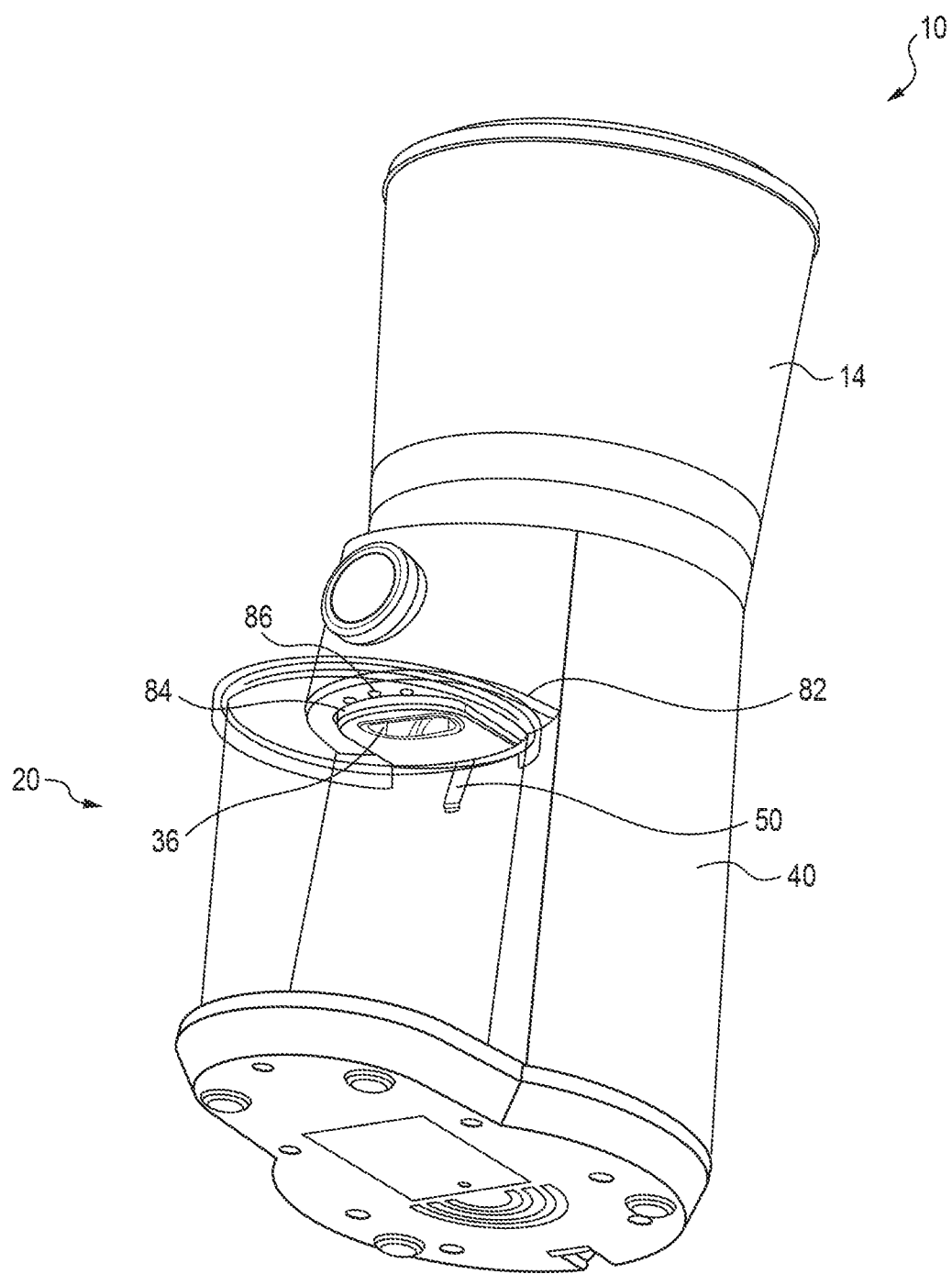
FIG. 3 is a lower perspective view of the coffee bean grinder of FIG. 2 with a receptacle shown as transparent.

FIG. 1 schematically depicts a coffee bean grinder 10 including a grinding apparatus 12, a hopper 14, a user interface 16, a controller 18, and a receptacle 20. The coffee bean grinder 10 is designed to minimize or neutralize an electrostatic charge on ground coffee beans 22 (schematically depicted in FIG. 1) and other fine particles exiting the grinding apparatus 12. FIGS. 2 and 3 depict a more particular embodiment of the coffee bean grinder 10; however, the coffee bean grinder 10 can take other shapes and configurations. Thus, the coffee bean grinder 10 is not limited to only the configuration shown in FIGS. 2 and 3.

The grinding apparatus 12 includes a motor 30 having an output shaft 32 operatively connected with a grinding mechanism 34. The motor 30 receives electrical power from an electrical power source (not shown) and the flow of power to the motor 30 is controlled by the controller 18. The grinding mechanism 34 can include burrs, grinding wheels, or another type of known mechanism that can be used to grind coffee beans to a desired powder-like substance. Typically, one burr is driven by the motor 30 and another burr or grinding wheel is stationary with respect to the moving burr. A gear box or other type of transmission can be disposed between the motor 30 and the burr similar to known coffee bean grinders. The grinding apparatus 12 also includes a ground coffee discharge 36 through which the ground coffee beans 22 are discharged from the grinding apparatus 12 toward the receptacle 20.

The hopper 14 is arranged with respect to the grinding apparatus 12 for feeding coffee beans 38 (depicted schematically in FIG. 1) to the grinding apparatus 12. In the illustrated embodiment, the hopper 14 is positioned vertically above the grinding apparatus 12 so that coffee beans 38 that are to be ground can be fed by gravity from the hopper 14 to the grinding apparatus 12.

The user interface 16 is provided on an exterior of a housing 40 for the coffee bean grinder 10 so as to be viewable by an operator of the coffee bean grinder 10. The user interface 16 can include a display 42 for displaying information to a user of the coffee bean grinder 10. The user interface 16 can also include user input devices 44, such as a button, a selector knob, a click wheel, or other similar device that can be pressed, touched, or manipulated by a user to input commands to the controller 18 of the coffee bean grinder 10 through the user interface 16.

The controller 18 is in electrical communication with the user interface 16 and the motor 30. The controller 18 controls the operation of the user interface 16 and the motor 30.

FIGS. 1 and 3 depict the receptacle 20 in a location where the receptacle 20 is arranged with respect to the grinding apparatus 12 such that coffee beans that have been ground by the grinding apparatus 12, i.e., the ground coffee beans 22, are delivered to the receptacle 20. With reference to FIG. 1, the receptacle 20 is placed beneath the ground coffee discharge 36 to receive the ground coffee beans 22 from the grinding apparatus 12. FIG. 3 depicts the receptacle 20 placed beneath the ground coffee discharge 36 to receive the ground coffee beans 22 from the grinding apparatus 12 for the embodiment of the coffee bean grinder 10 depicted in FIGS. 2 and 3, however as mentioned above, the coffee bean grinder could take other shapes and configurations. The receptacle 20 is removable from the location where the receptacle 20 is arranged with respect to the grinding apparatus 12 to receive the ground coffee beans 22 from the grinding apparatus 12. For example, after the grinding operation the ground coffee beans can then be transported within the receptacle 20 to a brew basket of a coffee brewing machine (described below). In an alternative arrangement, the receptacle 20 and the coffee bean grinder 10 could be part of a coffee brewing machine such that the receptacle 20 could be a brew basket of the coffee brewing machine.

The coffee bean grinder 10 also includes an electrical ground contact 50 that is electrically connected with ground 52 via a conductive path 54. The electrical ground contact 50 can be made from spring steel or any other electrically conductive material. The conductive path 54 can be made up of wires and other electrically conductive material positioned within the housing 40 of the coffee bean grinder 10. The conductive path 54 can also include a power cord (not shown), which can be conventional in configuration having an electrical plug that plugs into a conventional wall outlet. The conductive path 54 can include the wire in the aforementioned power cord that is connected with the ground prong of the electrical plug located at the end of the aforementioned power cord.

The electrical ground contact 50 is positioned with respect to the grinding apparatus 12 such that when the receptacle 20 is arranged to receive ground coffee beans from the grinding apparatus 12, the electrical ground contact 50 contacts (e.g., touches, physically comes in contact with) the receptacle 20. FIG. 2 depicts the electrical ground contact 50 extending away from the housing 40 in which the grinding apparatus 12 (not visible in FIG. 2) is located. The electrical ground contact 50 depicted in FIG. 2 extends outwardly away from a forward external wall 58 of the housing 40. The electrical ground contact 50 can be located elsewhere with respect to the housing 40 and the grinding apparatus 12. FIG. 1 depicts alternative locations (shown in broken lines in FIG. 1) for the electrical ground contact 50.

The electrical ground contact 50 is offset from the ground coffee discharge 36 of the grinding apparatus 12 such that the ground coffee beans 22 passing through the ground coffee discharge 36 do not contact the electrical ground contact 50. The electrical ground contact 50 can be located below the ground coffee discharge 36. Alternatively, the electrical ground contact 50 can be located offset from the ground coffee discharge 36 but not necessarily below the ground coffee discharge 36.

With reference to FIG. 2, the receptacle 20 can include a cup 70 and a lid 72, which is selectively removable from the cup 70. The lid 72 can fit onto the cup 70 so as to define a lid opening 74 to allow the ground coffee beans 22 (FIG. 1) being discharged through the ground coffee discharge 36 from the grinding apparatus 12 entry into the cup 70 so as to be collected by the cup 70. The cup 70 can be made from electrically conductive material, e.g., metal. The cup 70 can contact the electrical ground contact 50 when the receptacle 20 is arranged to receive ground coffee beans 22 (FIG. 1) from the grinding apparatus 12. More particularly, a side wall 76 of the cup 70 can contact the electrical ground contact 50 when the receptacle 20 is arranged to receive the ground coffee beans 22 from the grinding apparatus 12 which is shown for the electrical ground contact 50 shown in solid lines in FIG. 1. Alternatively, a base 78 of the cup 70 can contact the electrical ground contact 50 when the receptacle 20 is arranged to receive ground coffee beans from the grinding apparatus 12, which is shown for one of the electrical ground contacts 50 (lowermost) depicted in broken lines in FIG. 1.

In FIG. 3, the receptacle 20 is shown as transparent to show how the receptacle 20 cooperates with the housing 40 and the electrical ground contact 50. The receptacle 20 is shown in FIG. 3 in the position where the receptacle 20 is arranged to receive the ground coffee beans 22 (FIG. 1) from the grinding apparatus 12. The electrical ground contact 50 is visible in FIG. 3, however it is located on the outside of the cup 70 (see FIG. 2, not labeled in FIG. 3 for clarity purposes) and would not be visible where the cup 70 is made from an opaque material.

FIG. 3 shows the housing 40 including a hood 82 that is positioned over the receptacle 20 when the receptacle 20 is arranged to receive the ground coffee beans 22 (FIG. 1) from the grinding apparatus 12. An alignment feature 84 extends downwardly from the hood 82. The ground coffee discharge 36 extends through the alignment feature 84. The lid opening 74 is complementary in shape to the alignment feature 84, e.g., at least a portion of the periphery of the lid opening 74 matches the shape and contour of at least a portion of the periphery of the alignment feature 84. As such, the lid opening 74 receives the alignment feature 84 when the receptacle 20 is arranged to receive ground coffee beans 22 (FIG. 1) from the grinding apparatus 12 (FIG. 1) and the side wall 76 of the cup 70 is contacting the electrical ground contact 50. The cooperation between the cup 70, the lid 72, the hood 82, the alignment feature 84 and the location of the ground coffee discharge 36 inhibits the ground coffee beans 22 (FIG. 1) passing through the ground coffee discharge 36 from escaping into ambient. With the cup 70, which is made from an electrically conductive material, electrically connected with the electrical ground contact 50, the ground coffee beans 22 (FIG. 1) being discharged through the ground coffee discharge 36 contact the cup 70, thus neutralizing the electrostatic charge, while being collected in the cup 70.

To retain the lid 72 and to provide tactile feedback to the operator that the receptacle is properly located, bumps 86 can extend downwardly from the hood 82 offset from and adjacent to the alignment feature 84 and the ground coffee discharge 36. The bumps 86 contact the lid 72 when the receptacle 20 is arranged to receive ground coffee beans 22 (FIG. 1) from the grinding apparatus 12 and the side wall 76 of the cup 70 is contacting (e.g., physically touching) the electrical ground contact 50.

The lid 72 can also be made electrically conductive material, e.g., metal. Alternatively, the lid 72 of the receptacle 20 can be made from a dielectric material, e.g., plastic. Where the lid 72 is made from an electrically conductive material, the electrical ground contact 50 need not be positioned below the ground coffee discharge 36, but instead could be positioned next to, although offset from the ground coffee discharge 36. In such an embodiment, the lid 72 can contact the electrical ground contact 50 positioned adjacent to, although not below, the ground coffee discharge 36. For example, one of the electrical ground contacts 50 (uppermost) shown in broken lines in FIG. 1 could be contacted by the lid 72. Also, the electrical ground contact 50 could be located where the bumps 86 are located (see FIG. 3).

As mentioned above, the coffee bean grinder 10 could be part of a coffee brewing machine such that the receptacle 20 could be a brew basket of the coffee brewing machine. In such an arrangement, a hot water source 90 can be provided to supply hot water to the receptacle 20, which could be a brew basket holding a filter (e.g., a conventional paper filter) or the receptacle 20 could be in the form of a reusable filter with a screen. The receptacle 20 would include an outlet to allow liquid coffee, which has passed through the ground coffee in the receptacle 20, to pass into a carafe 92 or similar vessel.

Figure 4:
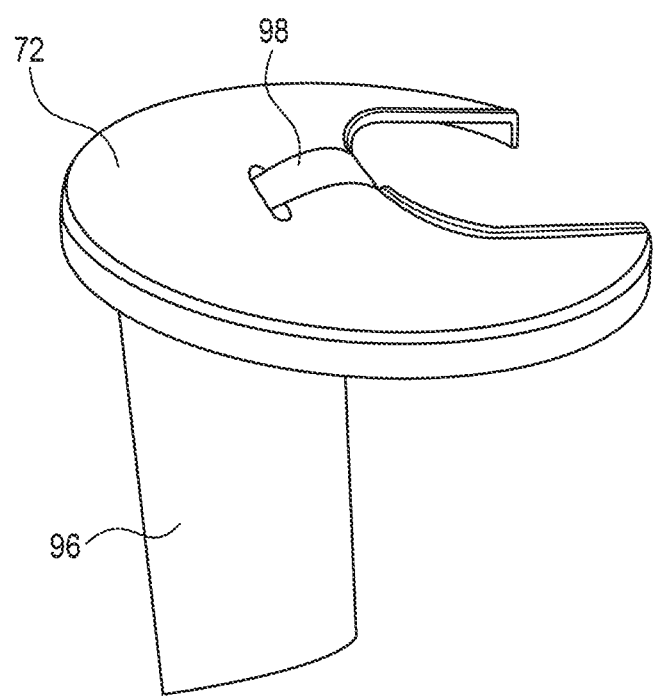
FIG. 4 depicts an alternative lid arrangement for the receptacle of the coffee bean grinder.

FIG. 4 depicts an alternative lid arrangement for the receptacle 20 where the receptacle 20 includes a fin 96 made from electrically conductive material and a receptacle contact 98 electrically connected with the fin 96. The receptacle contact 98 extends above the lid 72 and contacts the electrical ground contact 50 when the receptacle 20 is arranged to receive ground coffee beans from the grinding apparatus 12. When using this lid arrangement, it may be beneficial to locate the electrical ground contact 50 where the (uppermost) electrical ground contact 50 is shown in broken lines in FIG. 1, or where the bumps 86 are located (see FIG. 3). With the receptacle contact 98 electrically connected with the electrical ground contact 50, ground coffee beans 22 (FIG. 1) being discharged through the ground coffee discharge 36 contact the fin 96, which is positioned inside the cup 70, thus neutralizing the electrostatic charge while being collected in the cup 70.

A coffee bean grinder has been described above with particularity. Modifications and alterations will occur to those upon reading and understanding the preceding detailed description. The invention, however, is not limited to only the embodiments described above. Instead, the invention is broadly defined by the appended claims and the equivalents thereof.

The invention claimed is:

1. A coffee bean grinder comprising:
a grinding apparatus;
a hopper arranged with respect to the grinding apparatus for feeding coffee beans to the grinding apparatus;
a receptacle for receiving coffee beans that have been ground by the grinding apparatus, the receptacle includes an electrically conductive material and is removable from a location where the receptacle is arranged to receive ground coffee beans from the grinding apparatus; and
an electrical ground contact electrically connected with ground and positioned with respect to the grinding apparatus such that when the receptacle is arranged to receive ground coffee beans from the grinding apparatus the electrical ground contact contacts the receptacle,
wherein the receptacle includes a cup made from the electrically conductive material, and the electrical ground contact is positioned to be located at or nearer a top as compared to a bottom of the receptacle such that a side wall of the cup contacts the electrical ground contact when the receptacle is arranged to receive ground coffee beans from the grinding apparatus.

2. The coffee bean grinder of claim 1, further comprising a housing in which the grinding apparatus is located, wherein the electrical ground contact is electrically connected with ground via a conductive path that does not conduct electricity through the housing.

3. The coffee bean grinder of claim 1, wherein the electrical ground contact is made from spring steel and is offset from a ground coffee discharge of the grinding apparatus such that ground coffee beans passing through the ground coffee discharge do not contact the electrical ground contact.

4. The coffee bean grinder of claim 3, wherein the electrical ground contact is located below the ground coffee discharge.

5. The coffee bean grinder of claim 1, further comprising a housing in which the grinding apparatus is located,
wherein the housing includes a hood and an alignment feature extending downwardly from the hood, the ground coffee discharge extends through the alignment feature,
wherein the receptacle includes a lid that fits onto the cup and defines a lid opening,
wherein the lid opening is complementary in shape to and receives therein the alignment feature when the receptacle is arranged to receive ground coffee beans from the grinding apparatus and the side wall of the cup is contacting the electrical ground contact.

6. The coffee bean grinder of claim 5, further comprising bumps extending downwardly from the hood offset from and adjacent to the alignment feature, wherein the bumps contact the lid when the receptacle is arranged to receive ground coffee beans from the grinding apparatus and the side wall of the cup is contacting the electrical ground contact.

7. The coffee bean grinder of claim 1, wherein the receptacle includes a cup, a fin received in the cup and made from the electrically conductive material and a receptacle contact electrically connected with the fin, wherein the receptacle contact contacts the electrical ground contact when the receptacle is arranged to receive ground coffee beans from the grinding apparatus.

8. A coffee brewing machine in combination with the coffee bean grinder of claim 1.

9. A coffee bean grinder comprising:
a grinding apparatus including a ground coffee discharge through which ground coffee beans are discharged from the grinding apparatus;
a housing in which the grinding apparatus is located;
a receptacle for receiving coffee beans that have been ground by the grinding apparatus, the receptacle being removable from a location where the receptacle is arranged to receive ground coffee beans from the grinding apparatus;
a hopper arranged with respect to the grinding apparatus for feeding coffee beans to the grinding apparatus; and
an electrical ground contact electrically connected with ground, extended outwardly from an external wall of the housing, and positioned offset from and including at least a portion not below the ground coffee discharge such that ground coffee beans passing through the ground coffee discharge do not contact the electrical ground contact and an upper portion of the receptacle contacts the electrical ground contact when the receptacle is arranged to receive ground coffee beans from the grinding apparatus.

10. The coffee bean grinder of claim 9, wherein the electrical ground contact is electrically connected with ground via a conductive path that does not conduct electricity through the housing.

11. The coffee bean grinder of claim 9, wherein the electrical ground contact is made from spring steel and extends below the ground coffee discharge.

12. The coffee bean grinder of claim 9, wherein the receptacle includes an electrically conductive material and the electrical ground contact is positioned with respect to the grinding apparatus such that when the receptacle is arranged to receive ground coffee beans from the grinding apparatus the electrical ground contact contacts the electrically conductive material of the receptacle.

13. The coffee bean grinder of claim 12, wherein the receptacle includes a cup made from the electrically conductive material and a removable lid that fits onto the cup.

14. The coffee bean grinder of claim 13, wherein the cup contacts the electrical ground contact when the receptacle is arranged to receive ground coffee beans from the grinding apparatus.

15. The coffee bean grinder of claim 14, wherein a side wall of the cup contacts the electrical ground contact when the receptacle is arranged to receive ground coffee beans from the grinding apparatus.

* * * * *